(No Model.)

J. L. McCALEB.
MEASURING WHEEL.

No. 344,536. Patented June 29, 1886.

WITNESSES:
F. M. Ardle
C. Sedgwick

INVENTOR:
J. L. McCaleb
BY Munn & Co.
ATTORNEYS.

UNITED STATES PATENT OFFICE.

JOHN L. McCALEB, OF BENTON, TEXAS.

MEASURING-WHEEL.

SPECIFICATION forming part of Letters Patent No. 344,536, dated June 29, 1886.

Application filed January 9, 1886. Serial No. 188,098. (No model.)

*To all whom it may concern:*

Be it known that I, JOHN L. McCALEB, of Benton, in the county of Atascosa and State of Texas, have invented a new and Improved Measuring-Wheel, of which the following is a full, clear, and exact description.

My invention relates to the construction of an instrument whereby lineal measures may be taken and automatically registered where the distance is greater than the circumference of the measuring-wheel.

The invention consists of a graduated wheel in the slot of a bifurcated handle, and of an automatic registering attachment, which will be hereinafter described, and specifically pointed out in the claim.

Reference is to be had to the accompanying drawings, forming part of this specification, in which similar letters of reference indicate corresponding parts in all the figures.

Figure 1:
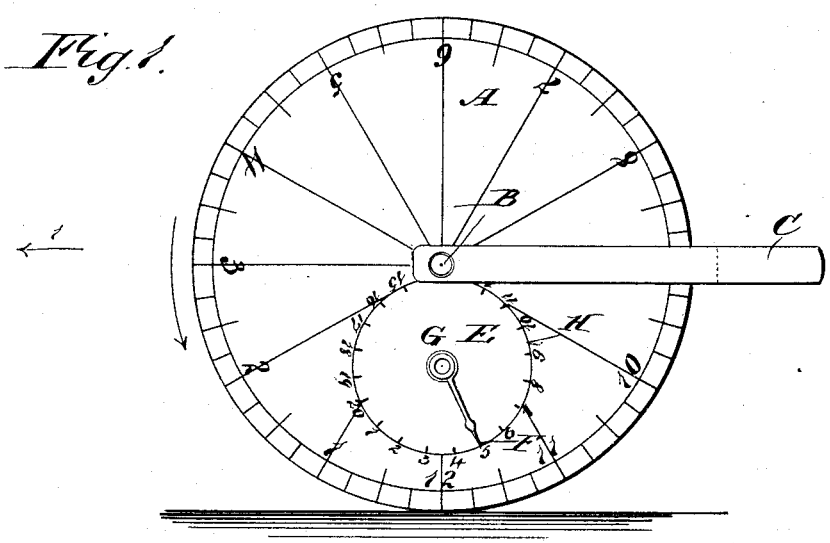
Figure 2:
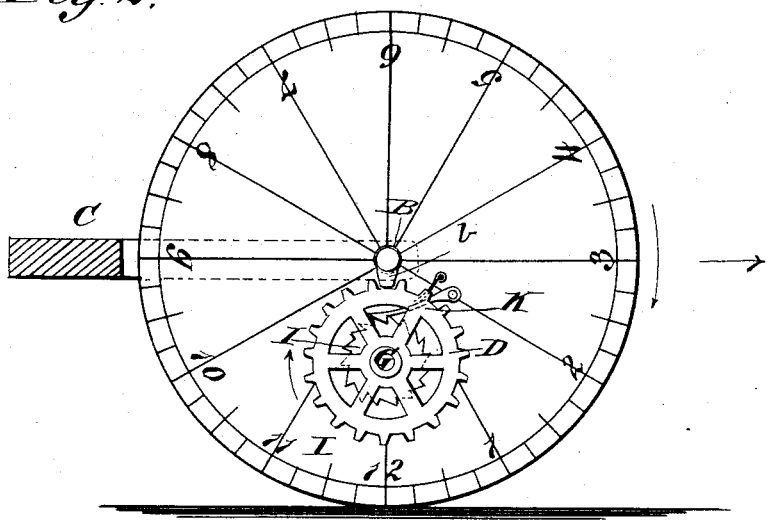
Figure 3:
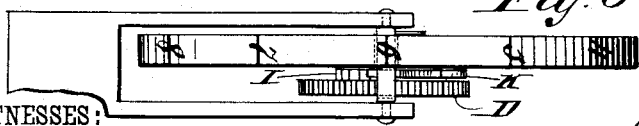
Figure 4:
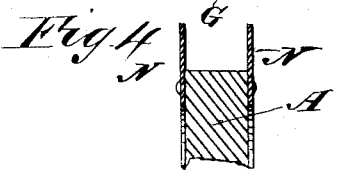

Figure 1 is a side view of my improved measuring-wheel. Fig. 2 is a view of the opposite side, one of the arms of the handle being cut away to disclose the construction of the parts. Fig. 3 is a plan view of the instrument, and Fig. 4 is a view of a modified construction.

In constructing such an instrument as is illustrated in the drawings, I provide a wheel, A, the periphery of which is graduated, the graduations extending in radial lines from the periphery toward the center of the wheel upon each of its side faces. This wheel is mounted upon a shaft, B, carried by a bifurcated handle, C. A toothed wheel, D, is carried by an arbor, G, which extends through the body of the wheel, a pointer, F, being also carried by the arbor, the toothed wheel D being mounted so as to be engaged by a lug or projection, $b$, carried by the shaft B. The pointer F revolves upon a graduated dial, H, formed on the face of the wheel A, while the toothed wheel D has as many divisions as there are numbers on the dial H. From this construction it will be seen that at every revolution of the wheel A the pointer F will be advanced one step upon the dial H, this movement being brought about by the engagement of the lug G with the toothed wheel D.

In order to prevent any retrograde movement of the wheel D, and consequently of the pointer F, I provide such wheel with a ratchet, I, which is engaged by a pawl, K, so that while the wheel and pointer are free to advance in one direction they will be held against any accidental movement in the opposite direction.

The wheel A is preferably formed with a circumference of twelve inches, divided into twelve equal parts of one inch each, the inches being, as usual, designated by numbered lines and the fractional parts of an inch by lines of varying length, as in the case of the ordinary form of rule.

To measure any distance with the instrument described, the wheel A is placed so that the division marked twelve will be upon the starting line or point, the wheel being then moved forward in direction of arrow No. 1, revolving in the direction of the arrow shown near its periphery.

If the distance to be measured is less than one foot, it may be read by noting the division of the wheel opposite the stopping-point; but if the distance is greater than one foot, it is read by noting the position of the pointer F upon its dial, said pointer having previously been moved to point to the highest number upon said dial.

In case the instrument is to be used for the purpose of measuring lengths of pipe, the wheel A is provided with guiding-plates N N, which are secured to each of its faces and project out beyond the periphery of the wheel, as shown in section in Fig. 4.

Having thus described my invention, I claim as new and desire to secure by Letters Patent—

The herein-described measuring-wheel, consisting of the handle C, the graduated wheel A, having the graduated dial H, the shaft B, provided with the projection $b$, the arbor G, toothed wheel D, the pointer F, the ratchet-wheel I, and the pawl K, substantially as shown and described.

JOHN L. McCALEB.

Witnesses:
JAMES L. WALLAR,
JOHN D. MORRISON.